Figure 1:
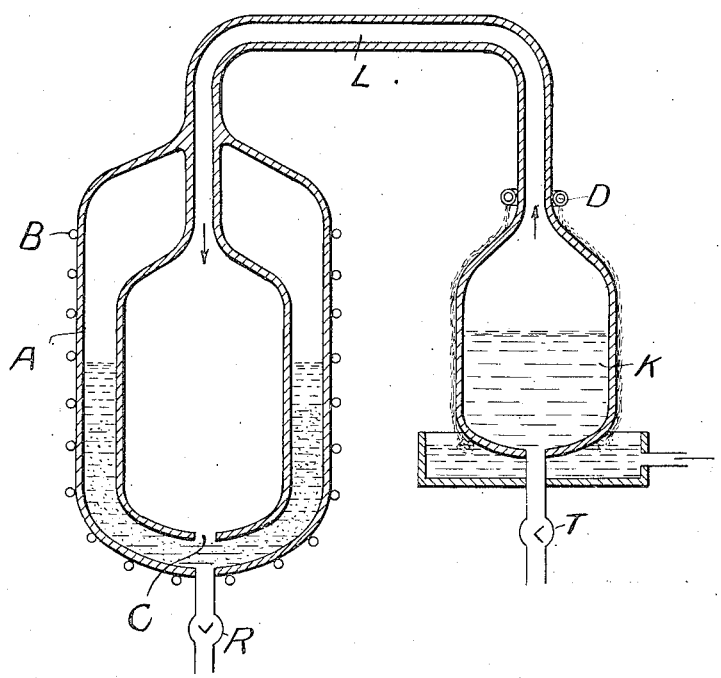

April 28, 1936.  H. KLEIN  2,039,170

ABSORPTION OF ETHERS

Filed Dec. 14, 1933

Inventor:
Hans Klein
By His Attorney

Patented Apr. 28, 1936

2,039,170

UNITED STATES PATENT OFFICE 2,039,170

ABSORPTION OF ETHERS

Hans Klein, Mannheim, Germany, assignor to I. G. Farbenindustrie Aktiengesellschaft, Frankfort-on-the-Main, Germany Application December 14, 1933, Serial No. 702,309
In Germany December 16, 1932

6 Claims. (Cl. 260—151)

The present invention relates to the absorption of ethers.

I have found that gaseous ethers, such as methyl-ethyl ether and in particular di-methyl ether, are readily absorbed by concentrated solutions of zinc halides and can then be stored in a simple manner without the application of pressure. Solutions of a zinc halide in water are particularly suitable for the purpose of the present invention, but inert organic solvents, such as alcohols, for example methyl- or ethyl-alcohol, or di-oxane, or mixtures or aqueous solutions thereof, may be used as well. Solutions of all zinc halides may be used, though solutions of zinc chloride are preferably used in view of their good absorptive capacity and their favorable price. Zinc bromide solutions may, however, be used as well, since their absorptive capacity is only slightly inferior. The absorptive capacity of zinc chloride solutions is extraordinarily high; thus one litre of an aqueous solution of zinc chloride of the specific gravity at 25° of 2.22 absorbs at 0° C. about 1.5 kilograms of dimethyl ether. A further advantage of the said zinc halide solutions resides in the fact that they again give off the absorbed ether even if they are but slightly warmed; thus it suffices to merely warm the said solutions to between 60 and 65° C. to drive off the major portion of the absorbed dimethyl ether.

Since even comparatively dilute solutions of zinc halides readily absorb gaseous ethers, the concentration to be employed mainly depends on whether the recovered ether should be rather free from the solvent. Since the water vapor tension of aqueous zinc halide solutions is very low, for this reason, also, water is used as the preferred solvent. Thus, with the zinc chloride solution mentioned above, the dimethyl ether recovered at about 60° C. is practically free from water. When employing aqueous zinc chloride solutions, they should generally speaking, have a specific gravity above about 1.74, preferably above about 1.94. The latter absorbs in 100 cubic centimetres about 88 grams of dimethyl ether at 0° C. and retains only about 22 grams thereof on heating to about 40° C. Solutions of zinc chloride in an inert organic solvent which may be used for the purpose of the present invention comprise, for example, solutions of 78 parts by weight of zinc chloride in 100 parts by weight of methanol, or 88 parts by weight of zinc chloride in a mixture of 50 parts by weight of dioxane and 50 parts by weight of water. Both of these solutions have a good absorptive capacity. The zinc halide solutions may be used over and over again for a long time. If the ether to be absorbed is completely dry, a small amount of water may be added to the zinc halide solution after it has been used for the absorption and recovery of ether 10 to 20 times. If on the contrary the ether to be absorbed contains small amounts of water vapour, as is usually the case as the result of its production, the water content of the zinc halide solution may be kept constant, if so desired, by raising or lowering the temperature at which the ether is driven off.

Even supersaturated solutions of zinc halides may be used, or such solutions as form supersaturated solutions on cooling, since in the presence of the absorbed ether the excess of zinc halide separates as a fine heavy powder which causes no trouble, for example by clogging the tube for introducing the ether.

Due to the strong absorptive capacity of the zinc halide solutions they may advantageously be employed for removing gaseous ether from gas mixtures containing the same. Thus, a gas mixture consisting of 90 per cent of methyl chloride and 10 per cent of dimethyl ether, as is obtained in the production of methyl chloride from dimethyl ether and hydrogen chloride, can be freed from the said ether by washing with a zinc halide solution. Washing may be carried out in stages according to the counter-current principle whereby zinc halide solutions containing gradually decreasing amounts of absorbed dimethyl ether are used.

Impurities contained in the zinc halide solutions do not appreciably impair the absorptive capacity of the solutions so that impure zinc halides may be made use of.

The absorption and driving off of the gaseous ether may be carried out in a closed system, such as used in refrigerating apparatus, as explained with reference to the accompanying drawing illustrating in vertical cross-section such closed system in Figure 1 in the absorbing and in Figure 2 in the driving off stage.

Figure 2:
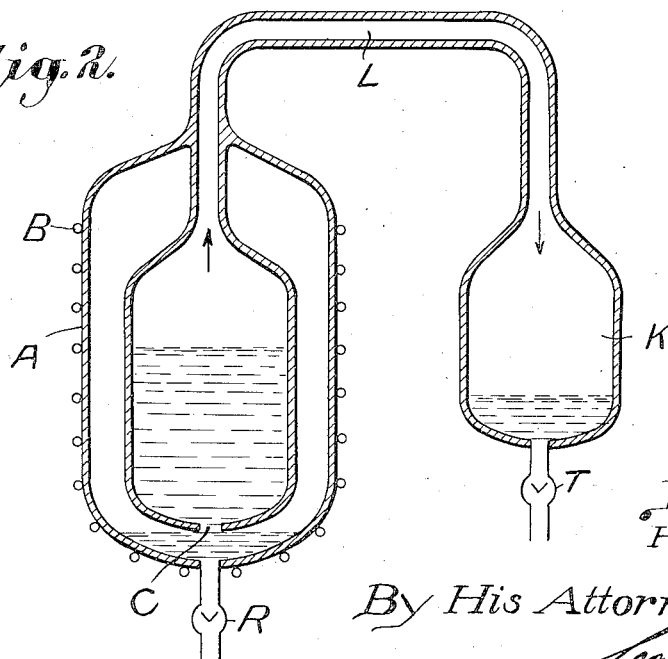

In Figures 1 and 2 A is the absorber containing the zinc halide solution which may be heated by means of the electric heating coil B. A cooling device may be provided at the absorber, but it is in most cases unnecessary and, therefore, is not shown. The absorber consists of two vessels arranged within each other so that the outer vessel forms a closed jacket around the inner one. The inner vessel communicates with the jacket by means of the hole C at the bottom of the inner vessel and is connected by pipe L to the condenser K which may be cooled by means of the sprinkling device D. During the absorption period as shown in Figure 1 the absorber is not heated, but may, if necessary, be cooled; the condenser is filled with liquefied ether and not cooled. The air is preferably removed from the system. The vapor of ether formed presses the zinc halide solution from the inner vessel into the jacket and bubbles therethrough while it is absorbed. The outer surface of the jacket is large enough to dissipate the heat of absorption even when cooled only by contact with the air. In order to drive off the ether from the zinc halide solution the absorber A is heated by means of the electric heating coil B and the condenser K cooled with water. In the jacket a higher tension of ether vapor is established on heating than in the inner vessel so that the zinc halide solution is pressed into the inner vessel as shown in Figure 2. The solution is thus out of direct contact with the heated jacket except the small amount left at the bottom of the jacket whereby overheating of the absorption liquid and consequently an undesired increase of pressure is prevented. The pressure established, which may amount to about 3 or 4 atmospheres, suffices to enable the ether vapor to be condensed in the condenser H by cooling with water only. In the system shown a large cooling surface is presented to the zinc halide solution during the absorption period, whereas a small heating surface is presented thereto during the driving off period. Zinc chloride solution may be added to or withdrawn from the system by means of valved pipe R while the normally gaseous ether, whether in liquid or gaseous form, can be added to or withdrawn from the system by means of valved pipe T.

In some cases, in particular when working in a closed system it may be advisable to add alcohol to the aqueous zinc halide solution in order to entirely prevent any hydrolysis of the ether.

What I claim is:

1. The process of absorbing a gaseous ether which comprises contacting the said ether with a concentrated solution of a zinc halide.

2. The process of absorbing a gaseous ether which comprises contacting the said ether with a concentrated aqueous solution of a zinc halide.

3. The process of absorbing a gaseous ether which comprises contacting the said ether with a concentrated aqueous solution of zinc chloride having a specific gravity above about 1.74.

4. The process of absorbing a gaseous ether which comprises contacting the said ether with a concentrated aqueous solution of zinc chloride having a specific gravity above about 1.94.

5. The process of recovering dimethyl ether from a gaseous mixture containing dimethyl ether and other gases which are not absorbed by concentrated solutions of zinc chloride which comprises contacting the said gaseous mixture with a concentrated solution of zinc chloride and recovering the dimethyl ether by heating the said solution.

6. The process of recovering a gaseous ether from a gaseous mixture containing such a gaseous ether and another gas which is not absorbed by concentrated solutions of zinc halides which comprises contacting the said gaseous mixture with a concentrated solution of a zinc halide and recovering the gaseous ether by heating the said solution.

HANS KLEIN.